2,814,875
LAWN EDGER

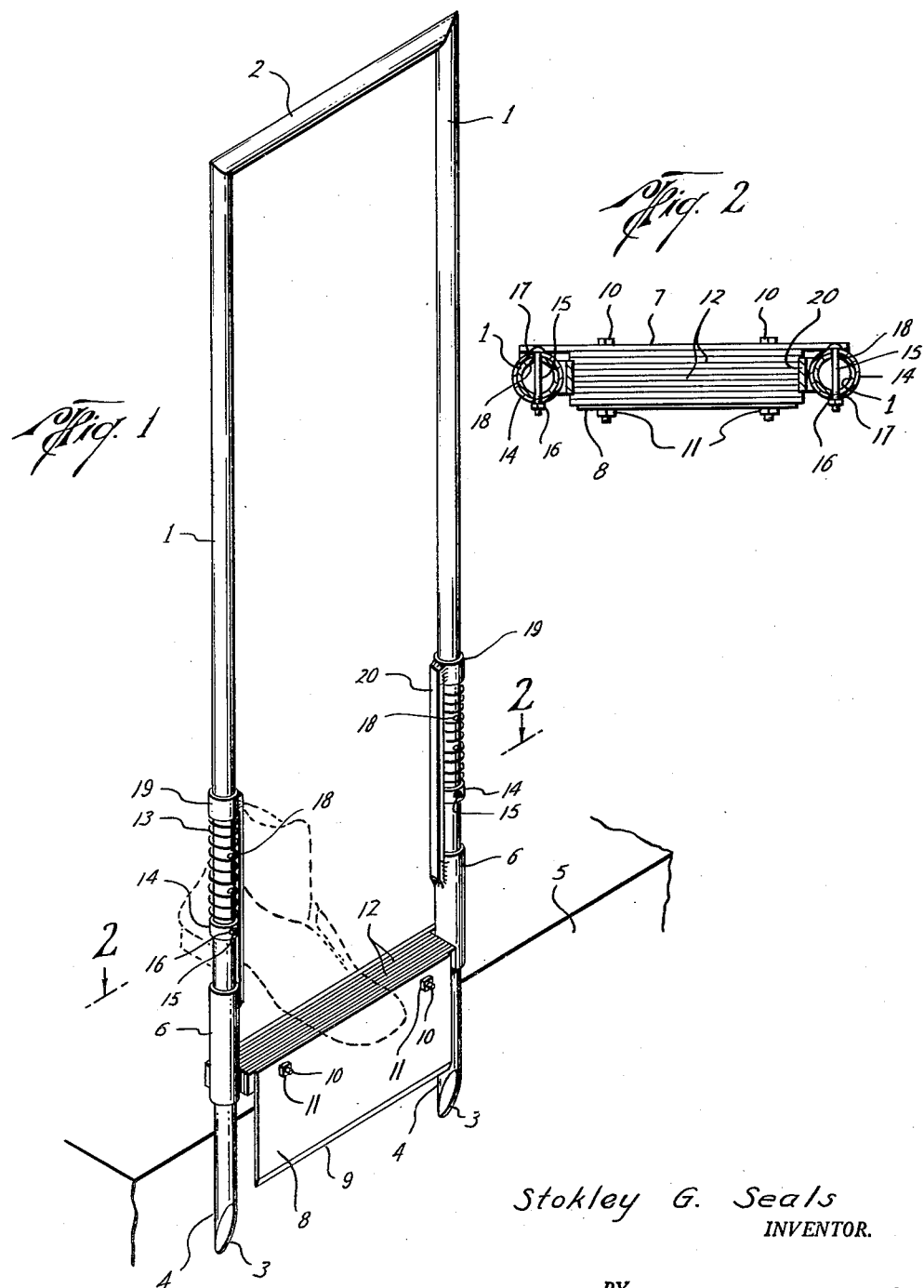

Stokley Goodson Seals, Houston, Tex.

Application December 19, 1955, Serial No. 554,001

4 Claims. (Cl. 30—315)

The invention relates to a lawn edger, and it concerns more particularly a foot operable edger having a light weight tubular frame consisting of a pair of vertically disposed side portions, which form handles capable of being grasped one in each hand, and a transversely disposed portion connected at its ends to the side portions, and a blade arranged transversely between the side portions, below the transverse portion, and lying in a plane which is parallel to the side portions, the blade being yieldably supported by the side portions and being capable of being urged downwardly with respect thereto by the application of foot pressure.

It is an object of the invention to provide an edger which may be operated with the foot, and with a minimum expenditure of effort.

Another object of the invention is to provide an edger which requires no stooping or bending in the operation thereof, and which permits an operator to stand in a vertical, upright position while using it.

Another object of the invention is to provide an edger in which the blade thereof is not likely to strike an adjacent curbing while in use.

Another object of the invention is to provide an edger which may be readily aligned with an adjacent curbing, and in which the blade thereof may be adjustably spaced from the curbing.

A further object of the invention is to provide an edger in which the lower edge of the blade, when in its uppermost position, may be spaced a predetermined distance, corresponding to the height of the grass, above the ground.

A still further object of the invention is to provide an edger which is of simple, rugged construction, which is inexpensive from the standpoint of its manufacturing cost, and which is relatively indestructible.

The invention will be readily understood by referring to the following description and the accompanying drawing, in which:

Fig. 1 is a perspective view of a lawn edger embodying the invention; and

Fig. 2 is a sectional view taken on the line 2—2 of Fig. 1.

Referring to the drawing, the lawn edger of the invention has a light weight tubular frame consisting of a pair of elongated side portions 1, which normally are disposed vertically, and form handles capable of being grasped one in each hand, and a transversely disposed end portion 2 which is shorter than the side portions 1 and is connected at its ends to the upper ends of the side portions 1. The lower ends of the side portions 1 are each tapered downwardly and inwardly on one side, designated by the numeral 3, which lies in an inclined plane and intersects the opposite side of the side portion 1, indicated by the numeral 4, to form a sharpened end portion for engagement with the ground. The side 4 of the side portion 1 provides a straight edge for engagement with an adjacent curbing 5 whereby the edger may be aligned with the curbing 5.

A pair of sleeves 6, each of which surrounds and slidably engages one of the side portions 1, are connected to opposite ends of a blade carrying bar 7, which is disposed transversely with respect thereto. A blade 8, which has a sharpened lower edge 9, is arranged transversely between the side portions 1 and lies in a plane which is parallel to the side portions 1. The blade 8 is adjustably and removably connected to the bar 7 as hereinafter described. A pair of bolts 10, each of which has a nut 11 applied to one end thereof, are each inserted thru aligned openings provided therefor in the bar 7 and the blade 8. One or more elongated spacing members 12, each of which has openings provided therein for engagement by the bolts 10, are positioned between the blade 8 and the bar 7 whereby the blade 8 may be adjustably spaced with respect to the bar 7.

The sleeves 6 are each yieldably supported by one of two compression springs 13 as hereinafter described. The compression springs 13 each surround one of the side portions 1. The lower end of each of the springs 13 engages one of two annular spring supporting member 14, each of which surrounds and slidably engages one of the side portions 1 and is adjustably and removably connected thereto as hereinafter described. A pair of bolts 15, each of which has a nut 16 applied to one end thereof, are each inserted transversely thru a pair of aligned openings 17 which are provided therefor in opposite sides of one of the spring supporting members 14, and are each selectively inserted thru one of several pairs of aligned openings 18 which are formed in opposite sides of the corresponding side portion 1. The several pairs of openings 18 are spaced longitudinally with respect to the side portions 1, whereby the spring supporting members 14 may be adjustably positioned with respect to the side portions 1. The upper end of each of the springs 13 engages one of two annular sleeve carrying members 19, each of which surrounds and slidably engages one of the side portions 1. A pair of links 20, each of which is arranged parallel to one of the side portions 1, are each connected at one end to one of the sleeve carrying members 19 and depend therefrom. The sleeves 6 are each positioned below one of the spring supporting members 14, and each of the sleeves 6 is connected to the lower end of one of the links 20 whereby it is suspended from the corresponding sleeve carrying member 19.

In the operation of the lawn edger above described, the sharpened lower ends of the side portions 1 are caused to penetrate the overlying grass whereby they rest directly upon the ground, and the blade is advanced downwardly in cutting engagement with the grass by applying foot pressure to the upper edges of the blade 8, the blade carrying bar 7 and the elongated spacing members 12 whereby the blade 8 is urged downwardly with respect to the side portions 1, against the upward pressure exerted by the springs 13. Upon releasing the pressure, the blade 8 is returned to its uppermost position by the action of the springs 13. The upper edges of the blade 8, the blade carrying bar 7 and the elongated spacing members 12 lie in a common plane and together form a comparatively broad surface for engagement by the foot of an operator, which is shown in dotted lines.

The lower edge 9 of the blade 8 may be positioned a predetermined distance above the lower ends of the side portions 1, whereby the blade 8, when in its uppermost position, may be spaced above the ground a distance corresponding to the height of the grass, by selectively inserting each of the bolts 15 thru one of the several pairs of openings 18. The blade 8 may be spaced a predetermined distance from the curbing 5 by varying the number of elongated spacing members 12 which are positioned between the blade 8 and the blade carrying bar 7.

The invention may be modified in various ways without departing from the spirit and scope thereof.

I claim:

1. A lawn edger comprising a tubular frame having a pair of vertically disposed elongated side portions, which form handles capable of being grasped one in each hand, and a transversely disposed portion, shorter than the side portions, connected at its ends to upper portions of the side portions, a pair of sleeves each surrounding and slidably engaging one of the side portions, a bar disposed transversely with respect to the sleeves and connected thereto at its ends, a blade carried by the bar and arranged transversely between the side portions, below the transverse portion, the blade having a sharpened lower edge and lying in a plane which is parallel to the side portions, a pair of annular members each surrounding and slidably engaging one of the side portions and positioned above one of the sleeves, the annular members each being adjustably and removably connected to one of the side portions, a pair of compression springs each surrounding one of the side portions and positioned above one of the annular members, the lower end of the spring resting upon the annular member, a pair of annular members each surrounding and slidably engaging one of the side portions and yieldably supported by one of the springs, and a pair of links each arranged parallel to one of the side portions, each of the links being connected at one end to one of the last mentioned annular members and depending therefrom, and each of the sleeves being connected to the lower end of one of the links whereby it is suspended from one of the last mentioned annular members.

2. A lawn edger as described in claim 1 in which the lower ends of the side portions are each tapered downwardly and inwardly on one side, which lies in an inclined plane and intersects the opposite side of the side portion to form a sharpened end portion for engagement with the ground, said opposite side providing a straight edge for engagement with an adjacent curbing whereby the edger may be aligned with the curbing.

3. A lawn edger as described in claim 1 in which the blade is adjustably and removably connected to the bar by a pair of bolts each having a nut applied to one end thereof, each of the bolts being inserted thru aligned openings provided therefor in the bar and the blade, and one or more elongated spacing members, each having openings provided therein for engagement by the bolts, positioned between the blade and the bar whereby the blade may be adjustably spaced with respect to the bar, the arrangement being such that the blade may be spaced a predetermined distance from the bar by varying the number of spacing members which are positioned between the blade and the bar, the upper edges of the blade, the bar and the spacing members lying in a common plane and together forming a comparatively broad surface for engagement by the foot of an operator.

4. A lawn edger as described in claim 1 in which the first mentioned annular members are each adjustably and removably connected to one of the side portions by a pair of bolts each having a nut applied to one end thereof, each of the bolts being inserted transversely thru a pair of aligned openings provided therefor in opposite sides of one of the annular members and being selectively inserted thru one of several pairs of aligned openings formed in opposite sides of the corresponding side portion, the several pairs of openings being spaced longitudinally with respect to the side portions whereby the annular members may be adjustably positioned with respect to the side portions, the arrangement being such that the lower edge of the blade, when in its uppermost position, may be spaced a predetermined distance above the lower ends of the side portions by selectively inserting each of the bolts thru one of the several pairs of openings provided therefor in the side portions.

References Cited in the file of this patent

UNITED STATES PATENTS

| | | |
|---|---|---|
| 2,506,371 | Lint | May 2, 1950 |
| 2,513,730 | Little | July 4, 1950 |